Figure 1:
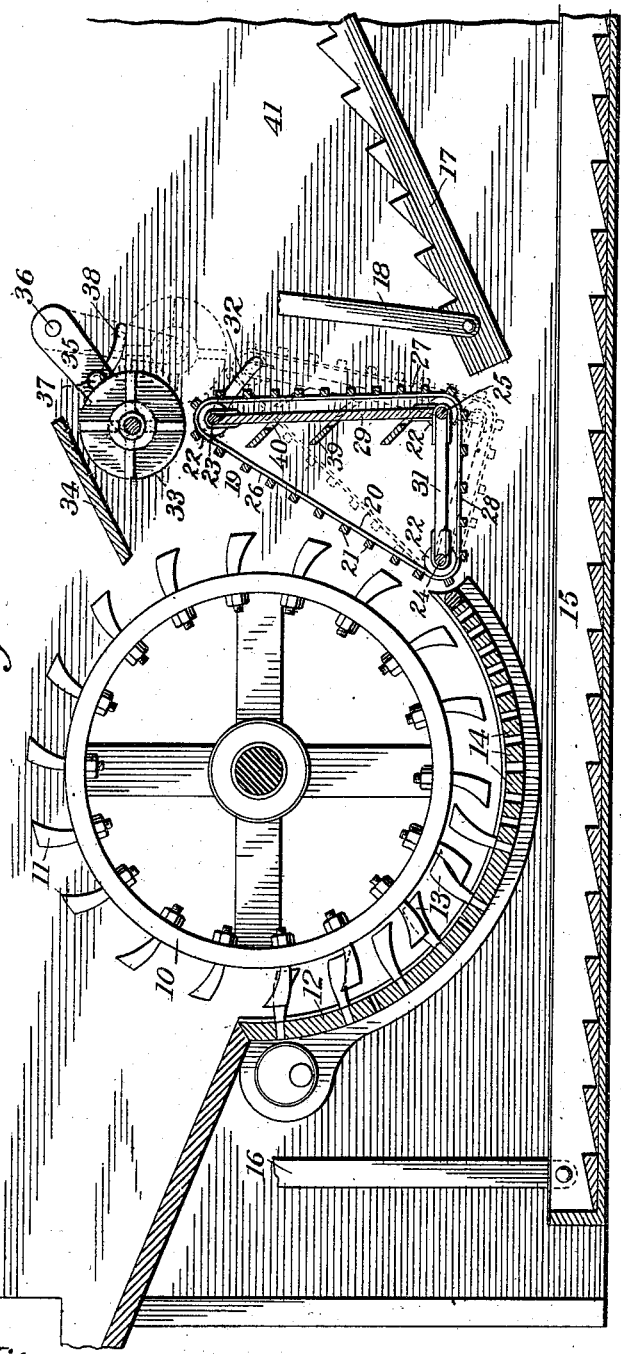

No. 723,713. PATENTED MAR. 24, 1903.
J. B. McCUTCHEON.
THRESHING MACHINE.
APPLICATION FILED FEB. 3, 1902.
NO MODEL.

Witnesses:

Inventor:
John B. McCutcheon
by Rexford M. Smith,
Att'y.

UNITED STATES PATENT OFFICE.

JOHN B. McCUTCHEON, OF BATTLECREEK, MICHIGAN, ASSIGNOR TO NICHOLS & SHEPARD COMPANY, OF BATTLECREEK, MICHIGAN.

THRESHING-MACHINE.

SPECIFICATION forming part of Letters Patent No. 723,713, dated March 24, 1903.

Application filed February 3, 1902. Serial No. 92,391. (No model.)

*To all whom it may concern:*

Be it known that I, JOHN B. MCCUTCHEON, a citizen of the United States, residing at Battlecreek, in the county of Calhoun and State of Michigan, have invented a certain new and useful Threshing-Machine, of which the following is a specification, reference being had therein to the accompanying drawings.

This invention relates to threshing-machines, and particularly to that class of machines in which the straw after being swept over the concave is urged by the cylinder-teeth over an inclined grate and delivered to the straw-carrier and grain-separating mechanism.

The primary object of this invention is to effectually separate a considerable quantity of the kernels from the straw immediately upon the discharge of the material from the concave and to that extent relieve the remainder of the machine and the mechanism thereof, thus effecting a saving in the power necessary to drive the machine and more thoroughly separating the kernels, straw, and chaff.

In order to attain the desired result, a steeply-inclined traveling endless grate is arranged immediately behind the cylinder and in close proximity to the sweep of the cylinder-teeth, such grate constituting, in effect, an extension of the concave, while behind the grate is located a checking and directing plate, which extends downwardly from a line adjacent to the upper end of the grate. The grate deflects and uplifts the straw, but not the flying kernels, the latter passing through the grate and impinging against the checking and directing plate, which intercepts them and causes them to fall into the underlying grain-pan, while the straw is carried upward by the traveling grate and delivered to the separating mechanism. The traveling grate constitutes in itself a straw-carrier and acts to rapidly advance the straw immediately upon its discharge from the concave, thus obviating the tendency for the material to accumulate upon an extended stationary grate and interfere with the continuity and smoothness of operation of the machine.

A further object of the invention is to provide for shifting the upper edge of the grate, so as to make the latter adjustable in relation to the sweep of the cylinder-teeth; also, to mount the traveling grate on several shafts so arranged as to cause the several runs of the grate to travel at an angle to each, and to mount the checking and directing plate between the runs of the grate at a distance from and at an angle to the main inclined run thereof in order that flying kernels after passing through said inclined run may be arrested and directed into the underlying grain-pan. The said arrangement also provides for the convenient mounting of the checking and directing plate between upper and lower shafts of the endless grate and enables said plate to be simultaneously adjusted with the upper end of the grate. A beater may be located adjacent to the upper edge of the grate, if desired, and made adjustable relatively thereto and to the cylinder in order to act with the best effect on the straw as it is carried upward by the grate.

With the foregoing and other objects in view the invention consists in certain novel features and details of construction and arrangement of parts, as hereinafter fully described, illustrated, and claimed.

Figure 2:
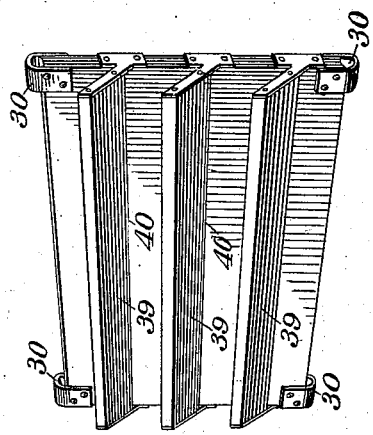

In the accompanying drawings, Figure 1 is a vertical longitudinal section through a sufficient portion of a cylinder-and-concave threshing-machine to illustrate the character and application of the present improvements. Fig. 2 is a detail perspective view of a checking and directing plate.

Like reference-numerals denote like parts in both figures of the drawings.

Referring to the drawings, and particularly Fig. 1 thereof, 10 designates a threshing-cylinder provided with the usual threshing-teeth 11 and operating in conjunction with a concave 12, also provided with teeth 13 on its active surface, said concave having a slotted or grated portion 14. Beneath the cylinder and concave is arranged an oscillatory or vibratory grain-pan 15, supported by suitably-swinging links 16, while above said grain-pan and in rear of the cylinder I have shown the initial straw carrier or shaker section 17, which is adapted to oscillate upon supporting-links 18.

In carrying out the present invention a traveling endless grate 19 is located immediately behind the threshing-cylinder and forms, in effect, an upward extension of the rear end of the concave. Said grate is in the form of an open slatted belt or apron, comprising, essentially, a pair of bands, belts, or chains 20, connected at intervals by cross slats or lags 21, which may be either of wood or metal and any desired shape in cross-section. The bands or chains 20 run over three sets of wheels or pulleys 22, mounted upon three different shafts 23, 24, and 25, which are disposed in triangular relation to each other or at the angles of a substantially right-angle triangle, as clearly shown in Fig. 1. The endless grate travels around the wheels or pulleys on said shafts and therefore has three different runs—namely, a forward inclined main run 26, a downwardly-moving and substantially vertical rear run 27, and a horizontally-moving bottom run 28. The forward or main run 26 is steeply inclined in close proximity to the sweep of the cylinder-teeth and serves to intercept, deflect, and uplift the straw as it is discharged from the concave by the cylinder-teeth, while the flying kernels or grains, which are loosened from the straw by the direct action of the cylinder, pass through the inclined run of the grate, where they are intercepted by a checking and directing plate 29, falling thence into or upon the underlying grain-pan 15.

The checking and directing plate 29 extends downward from a line coincident with or adjacent to the upper edge of the traveling endless grate and is arranged between the several runs of the grate, being at an angle to the main inclined run 26 and substantially parallel with the rear run 27. Said plate 29 may be mounted in any desired manner between the runs of the grate; but for convenience in the adjustment hereinafter referred to the plate 29 is provided at top and bottom with straps 30, which embrace the shafts 23 and 25 of the grate, the plate 29 being thus supported directly by said shafts. Braces 31 are interposed between the shafts 24 and 25 to maintain them at a proper distance from each other and admit of the ready and simultaneous adjustment of the grate and checking and directing plate. The checking and directing plate 29 acts as a brace between the shafts 23 and 25 of the grate and, in fact, constitutes a part of the frame of the traveling grate.

In order to provide for proper adjustment of the space between the grate and the cylinder-teeth, said grate is made adjustable, so that the forward inclined run thereof may be moved toward or away from the cylinder-teeth. This is preferably accomplished by extending the upper shaft 23 of the grate through curved slots 32, formed in the sides 41 of the casing or machine-frame, as shown in Fig. 1, any suitable means being employed in connection with said shaft 23 for fastening the same at any desired point of adjustment in the curved slots 32.

Located above the upper edge of the grate 19 is a beater 33, while extending from the upper portion of the beater toward the cylinder is a guard-board 34, which extends transversely of the machine-frame. It is also desirable to adjust the position of the beater in order to conform to any adjustment of the grate, and therefore said beater is, by preference, journaled between a pair of oppositely-located arms 35, pivotally mounted at 36 upon the machine-frame, the shaft of the beater being carried by the free or swinging ends of said arms. In order to fasten the beater when properly adjusted, one or both of the arms 35 may be provided with a suitable clamping or fastening device 37, extending downward through one or more curved slots 38 and provided exteriorly of the casing with nuts or other equivalents, which may be tightened or loosened at will. Any preferred means for fixing the adjustment of the grate and beater may, however, be resorted to.

The checking and directing plate 29 is provided on its forward face with a series of deflecting-slats 39, pitched at an angle suitable to intercept and deflect the flying kernels or grains which impinge against the same. These slats extend outward and upward from the plate proper, and at their inner edges spaces or openings 40 are left for the grains which may lodge on the slats to pass downward and find their way into the grain-pan.

The straw as it is discharged by the cylinder from the concave is intercepted by the forward run of the grate and carried rapidly upward thereby until it is acted upon by the beater, which assists in transferring the straw to the initial straw carrier or shaker. The flying grains or kernels, however, pass through the forward run of the grate and impinge against the checking and directing plate, as well as the inclined deflecting-slats thereof, thus intercepting said kernels and directing the same downward into the grain-pan. By reason of the downward divergence of the checking and directing plate and the forward inclined run of the grate a clearance-space is provided, which obviates the danger of the grain and straw choking the machine at that point. By the means described the forward inclined run of the grate may be adjusted into proper relation and proximity to the sweep of the cylinder-teeth. Simultaneously therewith the checking and directing plate is adjusted so that the same angle and relation are maintained between the forward run of the grate and the checking and directing plate, as well as the deflecting-slats of the latter. In addition to said adjustment the beater may be correspondingly adjusted to suit the varying conditions of the grain being operated upon. Thus at the very beginning of the operation of the machine a considerable quantity of loose grain is freed from the straw and delivered at once into the grain-pan, thereby to that extent relieving the subsequent burden of the machine and the operating mechanism thereof. By providing a traveling endless grate the straw is moved rapidly forward and prevented from accumulating upon the grate, and by promptly separating a considerable quantity of kernels from the grain less power is required to drive the machine and a more thorough separation of the grains from the straw and chaff is effected.

As before stated, any means may be employed for adjusting the beater and the upper shaft of the grate. It is also obvious that the checking and directing plate may be mounted between the runs of the grate in any convenient manner and that the angles of the several runs of the grate may be varied. These and other obvious changes may be resorted to without departing from the principle of the present invention.

Having thus described the invention, what I claim as new is—

1. The combination of a toothed cylinder, a concave comprising a concave portion, and a traveling endless grate having a plurality of runs, one of which is steeply inclined in close proximity to the sweep of the cylinder-teeth and which coöperates with the cylinder-teeth to elevate the straw while permitting the flying kernels to pass through said run, a vertically-disposed checking and directing plate located between the runs of the grate and extending from the upper end of the inclined run downwardly and forming a part of the grate-carrying frame, and a beater operating in close proximity to the upper end of said inclined run.

2. The combination of a toothed cylinder, a concave comprising a concave portion and a traveling endless grate having a plurality of runs one of which is steeply inclined in close proximity to the sweep of the cylinder-teeth and coöperates therewith to elevate the straw while permitting the flying kernels to pass therethrough, a checking and directing plate located between the runs of the grate and extending from the upper end of the inclined run downwardly and forming a part of the grate-carrying frame, means for simultaneously shifting the upper end of the inclined run and the checking and directing plate, and a beater operating in proximity to the upper end of said inclined run.

In testimony whereof I affix my signature in presence of two witnesses.

JOHN B. McCUTCHEON.

Witnesses:
CHESTER P. ALDRICH,
F. O. SMITH.